April 2, 1957  C. H. HOLSCLAW  2,787,476
TIE-DOWN FOR BOATS ON WHEELED TRAILERS
Filed Oct. 14, 1953
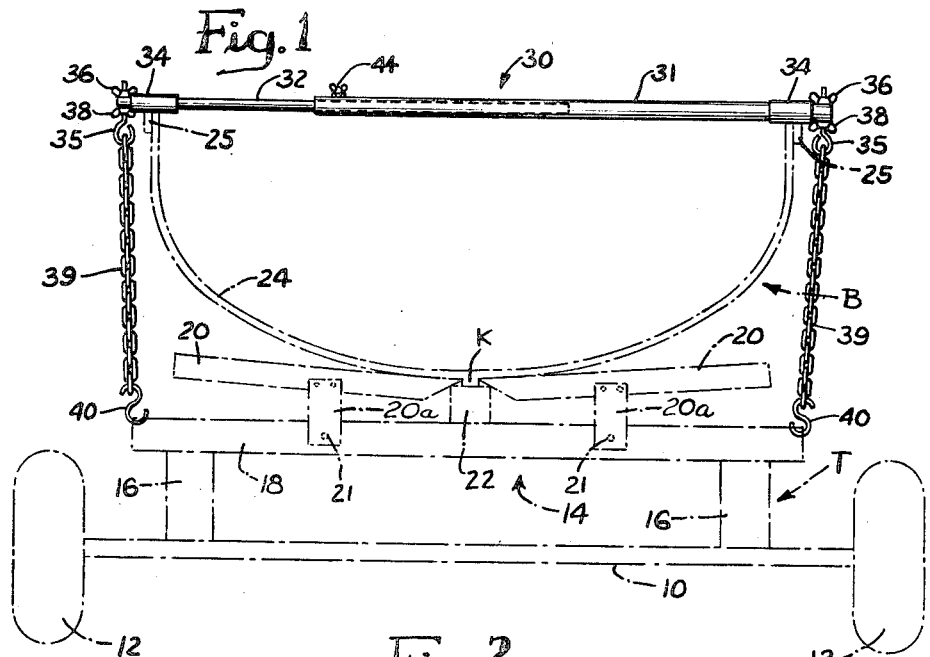
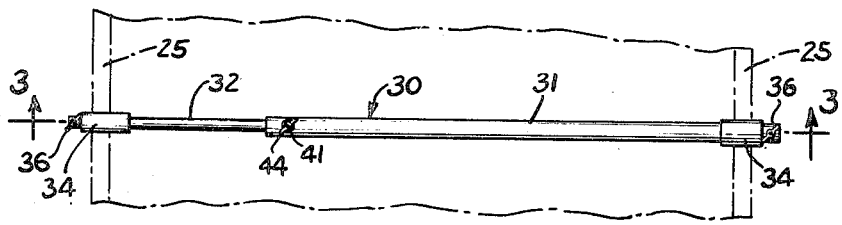
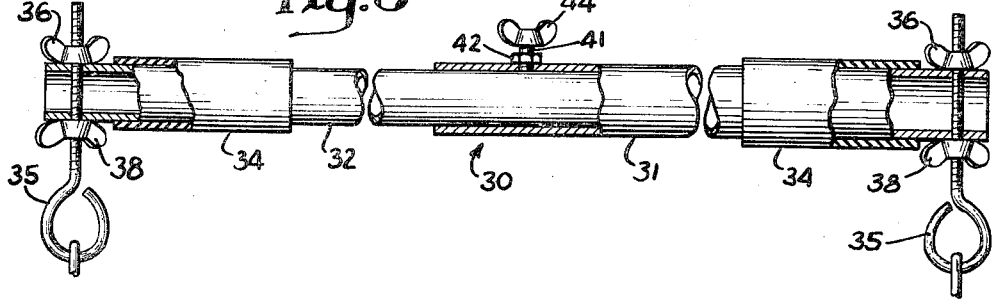
INVENTOR.
CHARLES H. HOLSCLAW
BY
Carlson, Pitzner, Hubbard & Wolfe
attys.

United States Patent Office 2,787,476
Patented Apr. 2, 1957

2,787,476

TIE-DOWN FOR BOATS ON WHEELED TRAILERS

Charles H. Holsclaw, Evansville, Ind.

Application October 14, 1953, Serial No. 386,080

3 Claims. (Cl. 280—179)

The present invention relates in general to cradling of boats in wheeled trailers and in particular to tie-downs for retaining boats of various widths snugly on the bed of a trailer.

It is a general aim of the invention to provide a tie-down device for use with trailers as are commonly utilized for overland transportation of small boats, which is quickly and easily adjustable to secure boats of various widths on the beds of various types of trailers, and yet which is of extremely simple though sturdy construction permitting of economical manufacture.

It is another object of the invention to provide a tie-down engageable with the boat on the transversely spaced gunwales thereof which is effective to cushionably hold the boat in place against both fore and aft and transverse movement with respect to the trailer, and without the necessity for first equipping the boat itself with any auxiliary fittings or pads.

The objects of the invention as thus generally set forth, as well as additional objects and advantages of the invention, will become apparent as the following description proceeds, taken in conjunction with the accompanying drawing in which:

Figure 1 is an elevation of a boat tie-down embodying the features of the present invention, here shown as applied to a boat on a trailer, the latter two being indicated in phantom and partly in transverse section.

Fig. 2 is a plan view of the tie-down shown in Fig. 1;

Fig. 3 is a detail view, partially in section taken along the line 3—3 in Fig. 2, of an extensible bar employed in the illustrative tie-down.

While the invention has been shown and is described in some detail with reference to a particular exemplary embodiment thereof, there is no intention that it be limited to such detail. On the contrary, the intention is to cover all such alterations, modifications, and equivalents falling within the spirit and scope of the invention as defined by the appended claims.

Referring more particularly to the exemplary embodiment of the invention here shown, the novel tie-down is illustrated (Fig. 1) in condition for securing a boat B on the bed of a boat trailer T so as to hold the boat against displacement relative to the trailer as the latter is pulled over road bumps or rough terrain.

The trailer here shown to make clear the environment of the invention may take variety of forms. As illustrated in this instance, the trailer T comprises a cross axle 10 journalling a pair of ground wheels 12, and a bed, generally indicated at 14, including a pair of longitudinal beams 16 which in turn support transverse members 18 for mounting a boat-carrying cradle. The latter preferably includes pairs of oppositely disposed, transversely extending sleepers 20 having centrally located legs 20a which are pivotally mounted as at 21 on the transverse members 18 and are adapted to have their inner opposed ends bear against a central longitudinal rib 22. The latter also serves as a support for the keel K of the boat B.

The boat here diagrammatically indicated for purposes of illustration, includes a hull 24 which is of concave cross section and at its upper sides is provided with reinforced gunwales 25. In the cradle of the trailer, the boat's keel K rests on the rib 22, being restrained against lateral shifting movement by the inner ends of the sleepers 20.

Pursuant to the present invention, the tie-down here illustrated as a preferred embodiment of the invention comprises an extensible bar 30 adapted for adjustment to position its end portions for engagement with the gunwales 25 of boats of various widths, with its extremities projecting outboard thereof. In the present instance the bar 30 is formed by an outer, larger diameter tubular member 31 at one end, and an inner smaller diameter tubular member 32 axially slidable within the former at the other end, thus having telescopic action for a wide range of adjustment in length. The bar is easily telescoped so that its end portions are located to bear on the gunwales 25 of the boat when placed transversely thereacross. For cushioning the engagement of the bar against the gunwales, its end portions are respectively provided with coaxially fitted sleeves or pads 34 which may be formed of any soft or resilient material such as rubber.

Flexible, tensile link means are provided between the extremities of the bar 30 and the underlying trailer bed 14, provision being made for adjusting the effective length thereof so as to accommodate boats of various heights whereby to effect a secure fastening of the boat in place on the trailer cradle. Such holding means may comprise, as here shown, inverted threaded eye bolts 35 vertically inserted through the extremities of the bar and retained by top adjusting wing nuts 36 and bottom locking wing nuts 38. Chains 39 are received each at its one end in one of the eye bolts, and depend for attachment to respective side edges of the trailer bed by means of S hooks 40. The S hooks are made so as to be receivable in any selected link of the chain. Thus, the effective length of the chain can be roughly adjusted by simply slipping the S hooks into the chain links that will give most closely the desired length. It will be readily apparent that with the adjustment wing nuts 36 loosened, i. e., run toward the upper ends of the eye bolts 35, it is but a simple matter to slip the S hooks 40 into engagement with the trailer bed and the depending ends of the chains 39 onto the S hooks, after which tightening of the adjustment wing bolts tensions the chains to snugly secure the boat in place. The bar 30 bears against the boat gunwales 25 but without marring or denting them due to the provision of the padding sleeves 34.

When the bar 30 is thus telescopingly adjusted to fit transversely across the boat gunwales 25 as shown, tensioning of the chains 39 fixes the adjusted length of the bar and prevents further telescopic movement in either direction. It has been found that the outer and inner members 31 and 32 do not slip relative to one another once the tie-down has been applied to the boat and trailer as described. Appropriate adjustment of the lengths of the chains provides, in effect, a snug quadrangular clamp composed of the trailer bed 14, chains 39, and transverse bar 30. The boat B can slide neither in a fore and aft direction nor in a transverse direction relative to the trailer T since either such translation would require stretching of the chains. While the opposed ends of the sleepers 20 may bear against the keel K, thus tending to prevent lateral shifting of the boat B or rocking thereof about a fore and aft axis, the tie-down here illustrated alone would prevent such movement relative to the trailer T, since such tendency of the boat to shift results in tensioning of the chains 39.

In accordance with a primary feature of the invention, the bar 30 is self-locking in a selected length when applied to a boat and trailer as shown. Should the bar 30 tend to elongate, the chains 39 would have to yield or stretch, and being rigid against such elongation, they effectively prevent relative shifting of the bar's telescoping members 31 and 32. Contraction of these members, on the other hand, is similarly prevented by tensioning of the chains or by engagement of the eye bolts 35 against the boat gunwales 25. As a result, the telescopic members 31 and 32 need not be locked in their relative positions when once set. It is only necessary to apply the bar 30 transversely across the boat gunwales 25, connect the depending ends of the chains 39 to the bed 14 and tighten the upper wing nuts 36. Tightening the lock nuts 38 assures permanency of a selected chain length and tension.

There has been illustrated in drawing, nevertheless, a set screw 41 for locking the two telescoping members 31 and 32 in a given relative position in order that the bar's length may be fixed for repeated use with the same or similar boats having gunwales spaced apart at the same transverse distance. This locking set screw 41 is threadably engaged with a nut 42 welded over an opening in the outer member 31. The screw, as shown is equipped with a winged fingerpiece 44 to assist in threading it into or out of locking engagement with the inner member 32. The set screw 41 is not necessary to the securing of the boat on the trailer cradle, but it may be tightened either as a psychological assurance to users who would otherwise feel that the telescopic members 31 and 32 might spread longitudinally and allow the boat to be displaced relative to the trailer, or to facilitate handling of the tie-down when it is not in boat-holding position.

From the foregoing, it will be apparent that the tie-down of the present invention is very simple in its organization and construction. Further, it is easily attached to or detached from a trailer and boat for effecting the holding function described. It is only necessary to slide the telescoping members 31 and 32 relative to one another until the bar 30 is of proper length to lie transversely across the boat gunwales 25 with the padding sleeves 34 bearing on the latter. Connection of the lower ends of the chains 39 to the bed 14 may then be accomplished in an instant, and the adjustment wing nuts 36 tightened to approximately adjust the length of the chains. The locking nuts 38 may be run fast against the extremities of the bar to prevent the adjustment nuts from jarring loose when the trailer is in transit. Removal of the tie-down for releasing the boat is likewise but a simple operation. One or both of the adjustment bolts 36 are loosened, the lower ends of the chains 39 detached from the bed 14, and the entire cross bar 30 with the chains attached lifted free of the boat B and trailer T.

I claim as my invention:

1. For use with a boat trailer having a wheel-supported bed for cradling a boat, a boat tie-down comprising, in combination, a bar freely extensible in a longitudinal direction and adapted to lie transversely across the gunwales of the boat, cushioning pads near the ends of said bar for resiliently yieldable engagement with the gunwales, and flexible, tensile link means adjustable in effective length interposed between the ends of said bar and the bed for drawing said bar against said gunwales and the boat snugly against the bed, whereby said bar may be constrained against extension after installation solely by tension in said link means.

2. For use with a boat trailer having a wheel-supported bed for cradling a boat, a boat tie-down comprising, in combination, a longitudinally extensible bar including freely telescoping inner and outer members, a resilient padding sleeve surrounding each member adjacent its free end, said bar being adjustable in length to lie transversely across boats of varying widths so as to position said sleeves for resilient engagement with the boat's gunwales, a pair of adjustable eye bolts having threaded ends inserted upwardly through the respective extremities of said bar, an adjusting nut and a lock nut threadably engaged with each of said eye bolts above and below said bar, respectively, and a pair of chains each being secured at one of their ends in the respective ones of said eye bolts and adapted at their other ends to be fastened on opposite sides of the bed, said chains under tension being alone sufficient to prevent extension of said bar after installation.

3. For use with a boat trailer having a wheel-supported bed for cradling a boat, a boat tie-down, comprising, in combination, a longitudinally extensible bar including freely telescoping inner and outer members, a resilient padding sleeve surrounding each member adjacent to its free end, said bar being adjustable in length to lie transversely across boats of varying width so as to position said sleeves for resilient engagement with the boat gunwales, a pair of adjustable eyebolts having threaded ends inserted upwardly through the respective extremities of said bar, an adjusting nut and a lock nut threadably engaged with each of said eyebolts above and below said bar respectively, a pair of chains each being secured at one of their ends to a respective one of said eyebolts, and a pair of S-shaped hooks each associated with one of said chains for securing the free ends of said chains to the trailer bed, said S-shaped hooks being adapted for reception in any of the chain links thereby allowing adjustment of the effective length of the chain to accommodate boats of different depths, whereby tensioning of said chains through tightening of said adjusting nuts locks the boat to the bed and said inner and outer members against telescoping movement.

References Cited in the file of this patent

UNITED STATES PATENTS

| 1,779,887 | Melanson | Oct. 28, 1930 |
|---|---|---|
| 1,939,863 | Seiter | Dec. 19, 1933 |
| 2,388,870 | Sackett | Nov. 13, 1945 |
| 2,462,964 | Heggen | Mar. 1, 1949 |
| 2,586,485 | Schroeder | Feb. 19, 1952 |
| 2,634,010 | Sass | Apr. 7, 1953 |
| 2,660,443 | Miller | Nov. 24, 1953 |
| 2,661,108 | Horn et al. | Dec. 1, 1953 |